US010276070B2

(12) United States Patent
Pascua et al.

(10) Patent No.: US 10,276,070 B2
(45) Date of Patent: Apr. 30, 2019

(54) STORED VALUE CARD AND CARRIER SYSTEM WITH TAMPER EVIDENT LABEL

(71) Applicant: Travel Tags, Inc., North Mankato, MN (US)

(72) Inventors: Shelle B. Pascua, Sherwood, OR (US); Deborah Bartles, Vancouver, WA (US)

(73) Assignee: Travel Tags, Inc., North Mankato, MN (US)

( * ) Notice: Subject to any disclaimer, the term of this patent is extended or adjusted under 35 U.S.C. 154(b) by 0 days.

(21) Appl. No.: 15/439,743

(22) Filed: Feb. 22, 2017

(65) Prior Publication Data

US 2017/0243098 A1 Aug. 24, 2017

Related U.S. Application Data

(60) Provisional application No. 62/298,278, filed on Feb. 22, 2016.

(51) Int. Cl.
*G06K 19/00* (2006.01)
*G09F 3/00* (2006.01)

(52) U.S. Cl.
CPC .................................. *G09F 3/0292* (2013.01)

(58) Field of Classification Search
USPC .................................................. 235/487–494
See application file for complete search history.

(56) References Cited

U.S. PATENT DOCUMENTS

| | | | | |
|---|---|---|---|---|
| 5,660,925 | A | 8/1997 | Cooley et al. | |
| 6,253,820 | B1 | 7/2001 | Landan et al. | |
| 6,286,999 | B1 | 9/2001 | Cappel et al. | |
| 8,292,072 | B2 | 10/2012 | Corey et al. | |
| 8,944,470 | B2 * | 2/2015 | Mayrhofer | G09F 3/0292 283/100 |
| 2003/0150762 | A1 | 8/2003 | Biller | |
| 2005/0045732 | A1 | 3/2005 | Whitaker | |
| 2012/0273576 | A1 | 11/2012 | Tomczyk et al. | |
| 2016/0005031 | A1 | 1/2016 | O'Regan et al. | |
| 2016/0031624 | A1 | 2/2016 | Pascua et al. | |
| 2016/0332789 | A1 | 11/2016 | Yerecic | |

* cited by examiner

*Primary Examiner* — Jamara Franklin
(74) *Attorney, Agent, or Firm* — Patterson Thuente Pedersen, P.A.

(57) ABSTRACT

A stored value card and carrier system, including an optional carrier, an inactive stored value card attached to the carrier, and a label, in which the label is removably adhered to at least a portion of the stored value card and at least a portion of the carrier, and the label is capable of indicating removal from the stored value card and the carrier or other tampering.

18 Claims, 13 Drawing Sheets

STORED VALUE CARD AND CARRIER SYSTEM WITH TAMPER EVIDENT LABEL

RELATED APPLICATION

The present application claims the benefit of U.S. Provisional Application No. 62/298,278 filed Feb. 22, 2016, which is hereby incorporated herein in its entirety by reference.

TECHNICAL FIELD

This application relates generally to stored value cards, and more particularly relates to a system used for packaging such cards to indicate any tampering with the cards done for fraudulent purposes.

BACKGROUND

Stored value cards, which may also be known as gift cards, debit cards, loyalty or reward cards, identification cards, prepaid cards, shopping cards or fare cards, prepaid MasterCard™ and Visa™ cards (instant issue) among other names, are very popular with both consumers and retailers. The wide appeal of stored value cards, as a result, has attracted the unwelcome attention of criminals seeking to exploit the conveniences and automated processes afforded by such cards. In particular, such criminals misappropriate and manipulate stored value cards and associated account information to perform fraudulent transactions. Stored value card fraud is typically perpetrated in the form of either at the physical point of sale (POS) or "card present" fraud, or for virtual POS purchases or "card not present" (CNP) fraud. The latter includes transactions, such as in e-commerce or internet purchases, which cannot be authenticated using "standard" processes used at the physical POS.

A stored value card is typically the size and shape of a conventional credit card (CR80 Card), but it may be other shapes and sizes as well, and includes a magnetic stripe, bar code, alpha/numeric, or other similar activation method, account identifying element, or means for using the card. The stripe, code, account identifying element, etc. on the card is encoded with data, which includes a unique account number. The account identifying element, for example, may be visible while the card is secured in or secured to packaging, such that the account identifying element may be used during the purchase and activation of the card.

Commonly, stored value cards are displayed by retailers for purchase by customers. The cards are stored in an active or inactive state. In the inactive state, the card cannot be used to purchase goods or services until the card has been activated. For example, one or more cards may be contained in a carrier, in which the card(s) and/or carrier includes an activation code associated with the card(s). The carrier obscures other card information, such as the card identification number, account identification number, and/or PIN until the carrier is opened and the card is removed.

A customer may have a card activated by bringing a card to a cashier and having the cashier then, for example, swipe the card through a point of sale terminal, which may add value to the card in exchange for payment, or activate value already on the card. In this context, the "swipe" action could involve passing a card (or its packaging) though a magnetic strip reader/writer; or passing the card or package over a barcode scanner; or putting the card or package in the vicinity of a proximity reader/writer (such as, for example, an RFID reader/writer or NFC reader), or any other equivalent activation technique. A balance on the card may be maintained within a computer system located at the point of sale or at a remote location. A holder of the stored value card may then use the card to purchase goods and/or services immediately or over time up to the value of the card. These current procedures relating to stored value cards, although providing convenience to consumers, leave the cards vulnerable to criminals. If the card is stored in an active state, the card does not need to be activated, and is ready for use upon extracting the card from the package. If the card is stored in the active state, however, the card, data, and value on the account may be even more vulnerable.

One particular fraud that is perpetuated by criminals with regard to stored value cards is called "skimming." Skimming is a serious problem resulting in significant loss to both retailers and consumers, and applies to both card present and CNP fraud. To skim a card having a magnetic stripe holding account information, for example, a criminal will purchase a stored value card from a retailer, thereby causing an account associated with the card to become activated. The criminal will then remove additional cards from the store that have not yet been activated, and will then alter magnetically stored information on the inactivated cards to match that of the activated card. As such, all of the altered, inactivated cards will have the magnetic information that identifies the account of the originally purchased card. The criminal will then return the altered cards to the store shelf where unsuspecting customers seeking to purchase a stored value card will unknowingly place money into the account of the criminal holding the originally purchased card. The unsuspecting customer may attempt to use their card and will be told that it has no associated value or has a smaller value than thought.

Alternatively, a criminal will remove at least two cards from the location or store of a retailer unbeknownst to the retailer. The magnetically stored information of the first card is altered to match the magnetically stored information of the second card. The first card is returned to the store, again unbeknownst to the retailer. When the first card is subsequently purchased and activated, it also activates the second card which is in the possession of the criminal.

In either case, the retailer may be able to verify that the customer did not use the value associated with the stored value card, and in the interest of customer service, may restore the value to the customer. In that case, the retailer loses the money. However, in some cases, there may be no way to prove fraud and the customer may lose up to the entire value.

Another fraud perpetuated by criminals is carried out by the criminal viewing stored value cards in the store. The criminal writes down the code associated with the particular stored value card (such as a credit card type number) while it is still in the store. In such situations the code is in plain view of the criminal or may be easily viewed without altering the card packaging. Once the criminal has recorded the code, the criminal waits for a period of time, assuming that an unsuspecting customer will purchase and have the card activated during that time. The criminal then periodically checks to see if they are able to make purchases, such as online purchases (CNP fraud), by attempting to use the card code. If the card has been activated by the true purchaser, the criminal will be able to purchase goods online using the activated code, thereby stealing the balance on the card from the true purchaser.

Criminals may perpetuate the above-described frauds or other frauds with regard to stored value cards as they sit on store shelves today. Thus, there is a need for a way to protect such cards and insure that they have not been tampered with or duplicated prior to purchase or activation by an innocent consumer.

There have been proposals and attempts to reduce the occurrence of fraud associated with stored value cards. For example, modifications to card readers or other parts of the activation process have been proposed, but changing existing systems in such ways involves significant cost. Additional steps have been added to the activation process for some cards, such as steps involving pin numbers and web access. However, additional steps reduce the level of convenience that such cards provide to consumers. Overall, there is a need for a way to prevent fraud relating to stored value cards that is effective, and inexpensive to implement, while at the same time not negating the convenience of stored value cards.

SUMMARY OF THE DISCLOSURE

In one aspect, a stored value card and carrier system comprises a carrier, at least one inactive or active stored value card attached to or otherwise contained within the carrier and a label, in which the label is removable adhered to one or more of a portion of the stored value card, at least a portion of the carrier, or another surface of the system such as an insert or panel sandwiched within the carrier. The label is designed, such that if removed, the label indicates tampering. Specifically, at least partial removal of the label optically indicates tampering with the system.

In a second aspect, a tamper evident label comprises a layer capable of indicating tampering; a layer of removable adhesive proximate the tamper indicating layer; and a lamination layer and/or a printable film or coating layer(s) proximate the tamper indicating layer and opposite the removable adhesive layer. In some embodiments, the lamination layer and/or printable layer(s) are removable from the underling tamper indicating layer via a release layer or breakaway coating layer.

In the embodiments, a tamper evident label is irreversibly destroyed upon removal of the label from the card, carrier, and/or insert to which it is attached. The label cannot be copied or replaced such that tampering or removal of the card prior to activation is evident.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
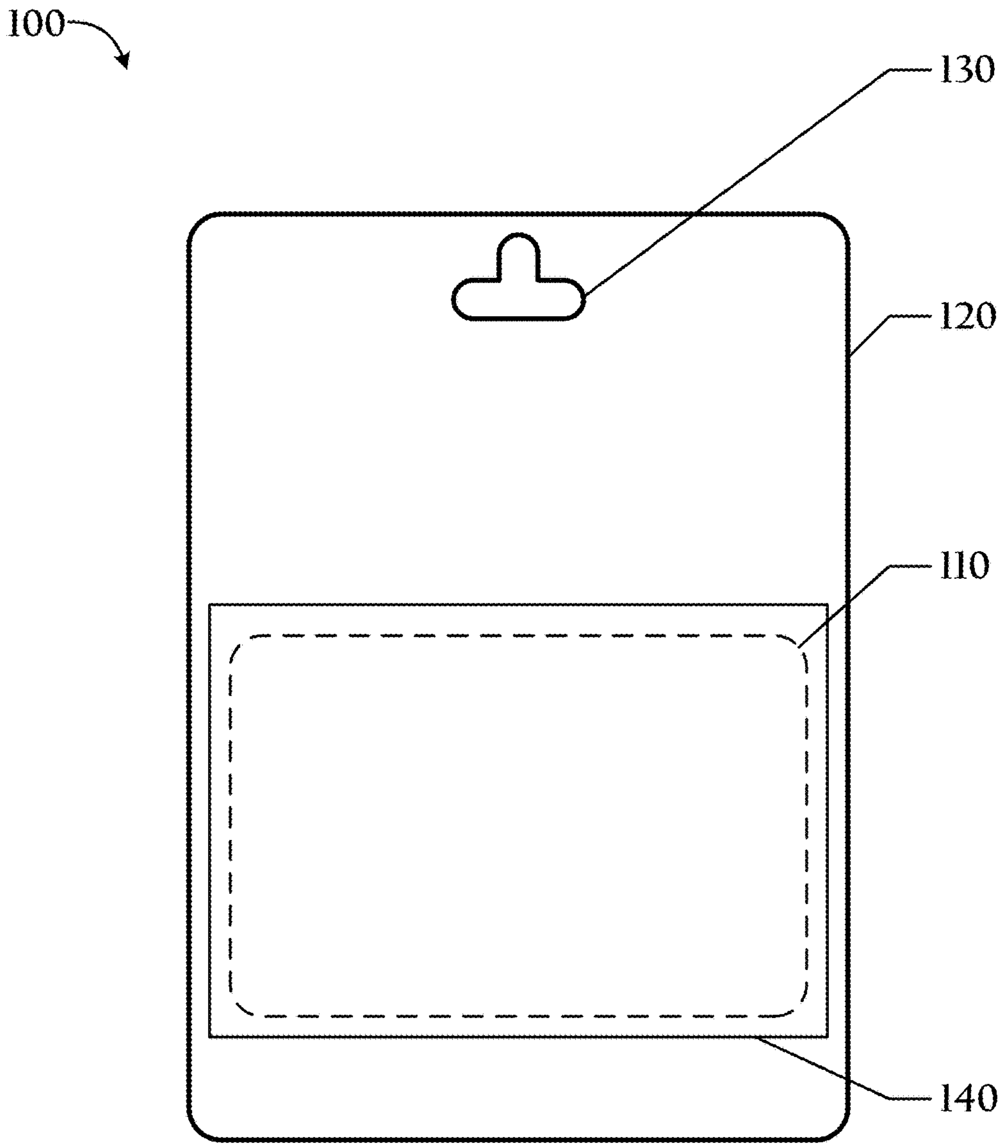
FIG. 1 is a top plan view of an exemplary card and carrier system in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

The embodiments described below are not intended to be exhaustive or to limit the invention to the precise forms disclosed in the following detailed description. Rather the embodiments are chosen and described so that others skilled in the art may appreciate and understand the entire disclosure.

In one embodiment, a stored value card and carrier system employs one or more tamper evident labels and related methods. Another embodiment is the tamper evident label itself. Before describing in detail the stored value card and carrier system and related methods, and the tamper evident label, it should be observed that the invention is not limited to the particular embodiments depicted in the exemplary figures or described in this application.

An advantage of these embodiments is that currently existing carriers and stored value cards may be used without modification. The tamper evident label may simply be added to current carriers and cards to prevent fraud. Therefore, the cost of implementing such a change to existing systems is low.

Another advantage is that the tamper evident label indicates tampering or fraud by incurring damage upon removal from the card, insert if present, and/or carrier if present, but the label does not damage the card and/or carrier when removed. As a result, the card and carrier remain attractive for gift-giving purposes after activation.

Yet another advantage is that the tamper evident label provides adequate adhesion, destructibility and removability. The label is also advantageously able to adhere to both a paper printed surface and a plastic card.

Referring now to FIG. 1, an exemplary embodiment of a stored value card and carrier system is depicted. FIG. 1 shows a top plan view of such a stored value card and carrier system 100. The system 100, as shown, includes a carrier 120. The carrier 120 shown is a single panel. Other configurations are also possible, however. The carrier 120 is illustrated with an optional opening or aperture 130 through the carrier that can be used to hang the carrier in a retail establishment display. The shape of the aperture shown is one alternative shape and other shapes are also contemplated.

An inactive or active stored value card 110 (shown in outline) is attached to the carrier 120. The card 110 includes at least one account identifying element (not shown). The means for attaching the card 110 to the carrier 120 is not shown, but may be any suitable means, such as a line or dots of adhesive, for example, or a pocket added to (or formed in or by) the carrier 120.

A tamper evident label 140 is adhered to the card 110 and carrier 120 such that the card 110 is completely enclosed in between the label 140 and the carrier 120. In this embodiment, the card 110 is completely enclosed as shown to provide the most protection from fraud for the card 110. However, label 140 may be adhered to only a portion of the card 110 in addition to a portion of the carrier 120. The label 140 is removable adhered to the card 110 and carrier 120 such that removal does not damage the card 110 and carrier 120. However, label 140 is damaged or distorted if removed or tampered with.

The details regarding the components of these embodiments of the stored value card and carrier system of the invention are described in detail below.

Figure 2:
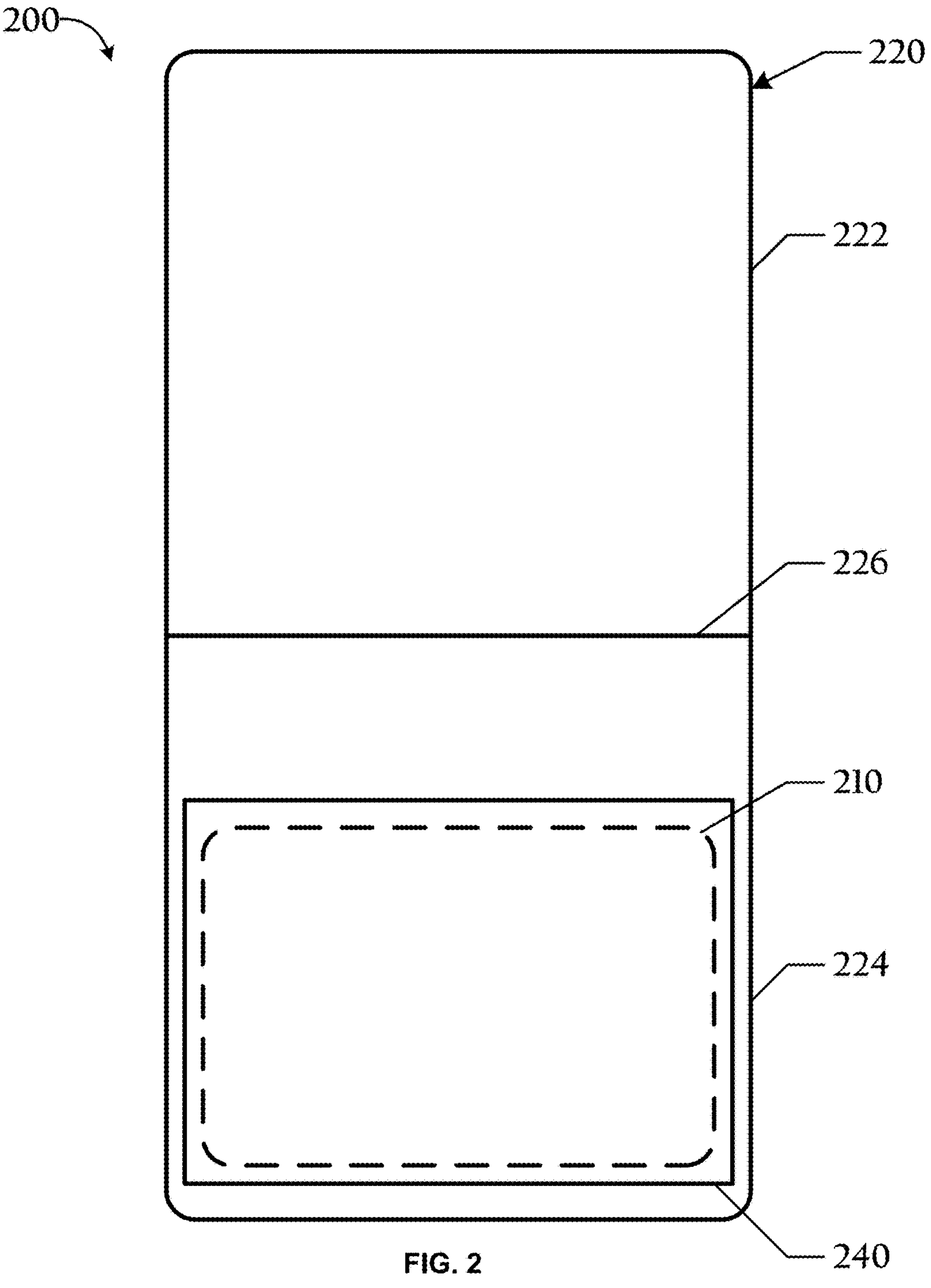
FIG. 2 is a top plan view of another exemplary card and carrier system in an open position in accordance with an embodiment.

FIG. 2 shows a top plan view of another exemplary embodiment of a stored value card and carrier system 200. The system 200 has a carrier 220 with a two-panel design that sandwiches a stored value card 210 (shown in outline) between two panels 222, 224 by folding the two panels 222, 224 at fold line 226 and adhering the two panels 222, 224 together. Alternatively, two discrete panels corresponding to panels 222 and 224 could be adhered or otherwise attached together to sandwich stored value card 210 without employing a fold line. The purpose of sandwiching the card 210 is to cover any account identifying elements on the card 210 from view and to cover any embossed account identifying elements with at least one panel of carrier material, thereby preventing fraud. Adhesive is used to hold the panels 222, 224 together in a conventional manner. Alternatively, the panels 222, 224 can be sealed together by heat sealing, ultrasonic welding, corresponding physical protrusions (with or without adhesive), any of a variety of sealing means, or combinations thereof. In yet another embodiment, panels 222, 224, and/or an opening tab, pull tab, or any other means of accessing the carrier can be held or sealed together by a tamper evident label of any of the embodiments described such that access to the carrier prior to activation is evident.

In the system 200, a tamper evident label 240 is adhered to the carrier 220 and card 210. The label 240 completely covers the card 210 in the embodiment shown, although label 240 may be adhered to only a portion of the card 210 in addition to a portion of the carrier 220. The label 240 adds further protection to the card 210 from fraud. Even if a fraudulent actor is able to open and re-seal the carrier 220, any tampering would be evident on account of the presence of the tamper evident label 240.

Figure 3:
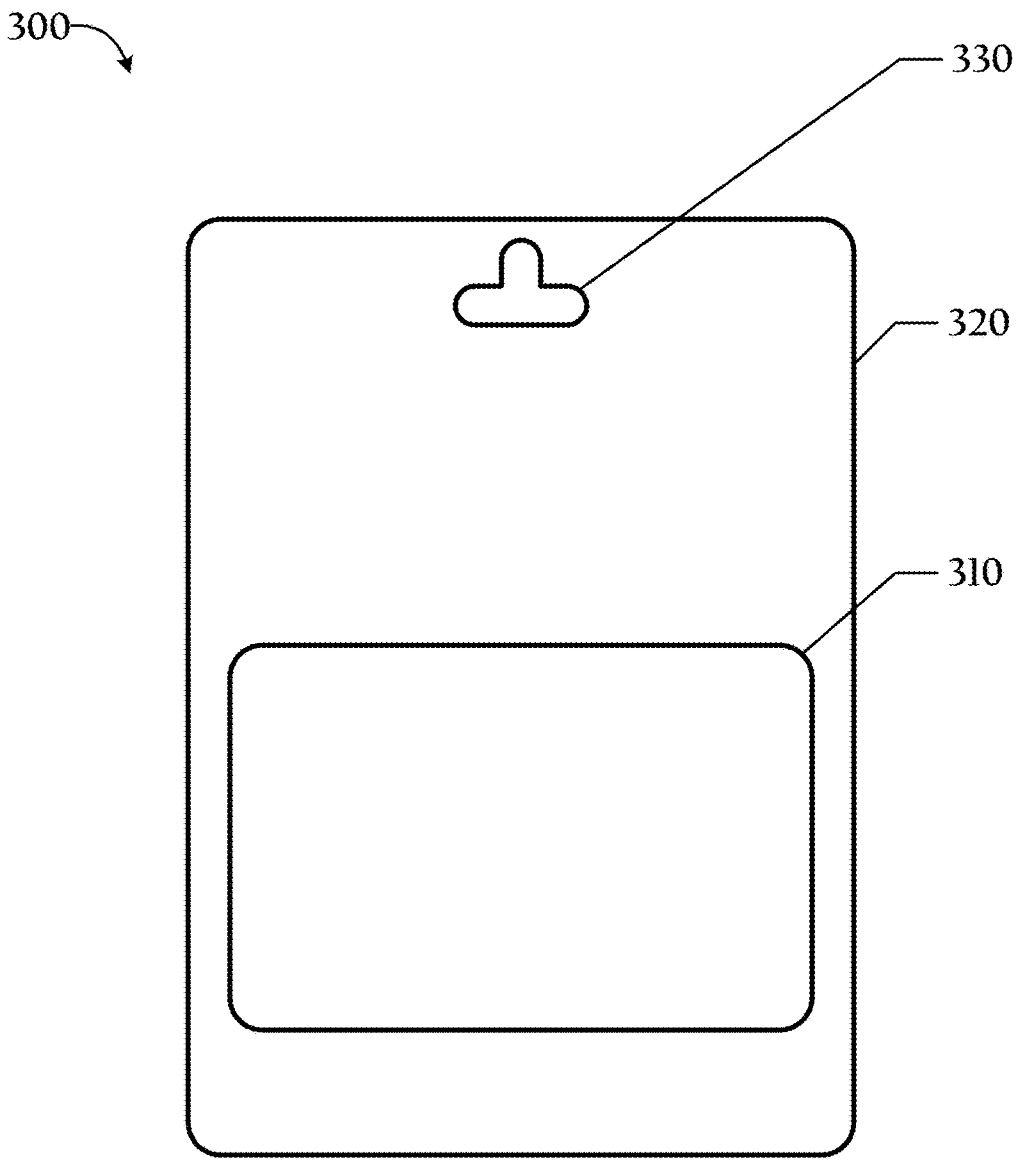
FIG. 3 is a top plan view of another exemplary card and carrier system in accordance with an embodiment.
Figure 4:
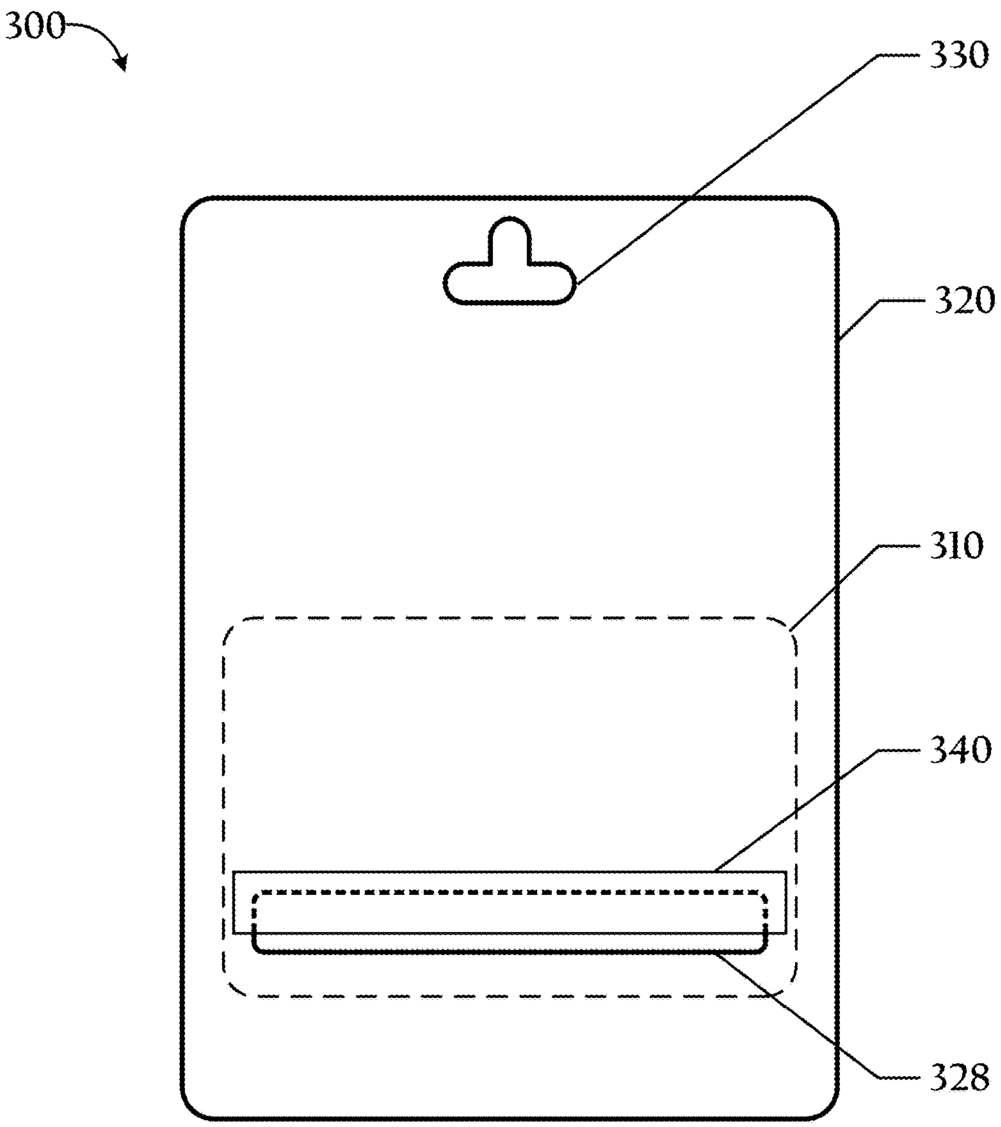
FIG. 4 is a bottom plan view of the embodiment of FIG. 3.

FIGS. 3 and 4 show top and bottom plan views, respectively, of another exemplary embodiment. A system 300 is shown which includes a carrier 320 made of a single panel, a stored value card 310, and a tamper evident label 340 (seen in FIG. 4). FIG. 3 schematically represents various ways of presenting card 310 such that it is visible from the front of system 300, such as a blister package design. Referring specifically to FIG. 4, one side of carrier 320 includes an aperture or opening 328 (shown partially in outline) over which the card 310 is placed and attached in order to expose certain information on the card 310. In order to activate the card 310, however, the tamper evident label 340 would have to be removed a sufficient amount (perhaps in full) to allow access to certain account identifying information on the card 310. Alternatively, the label 340 could cover the whole area of the card 310 that shows through aperture 328. An optional opening or aperture 330 through the carrier is shown that can be used to hang the carrier in a retail establishment display.

Figure 5:
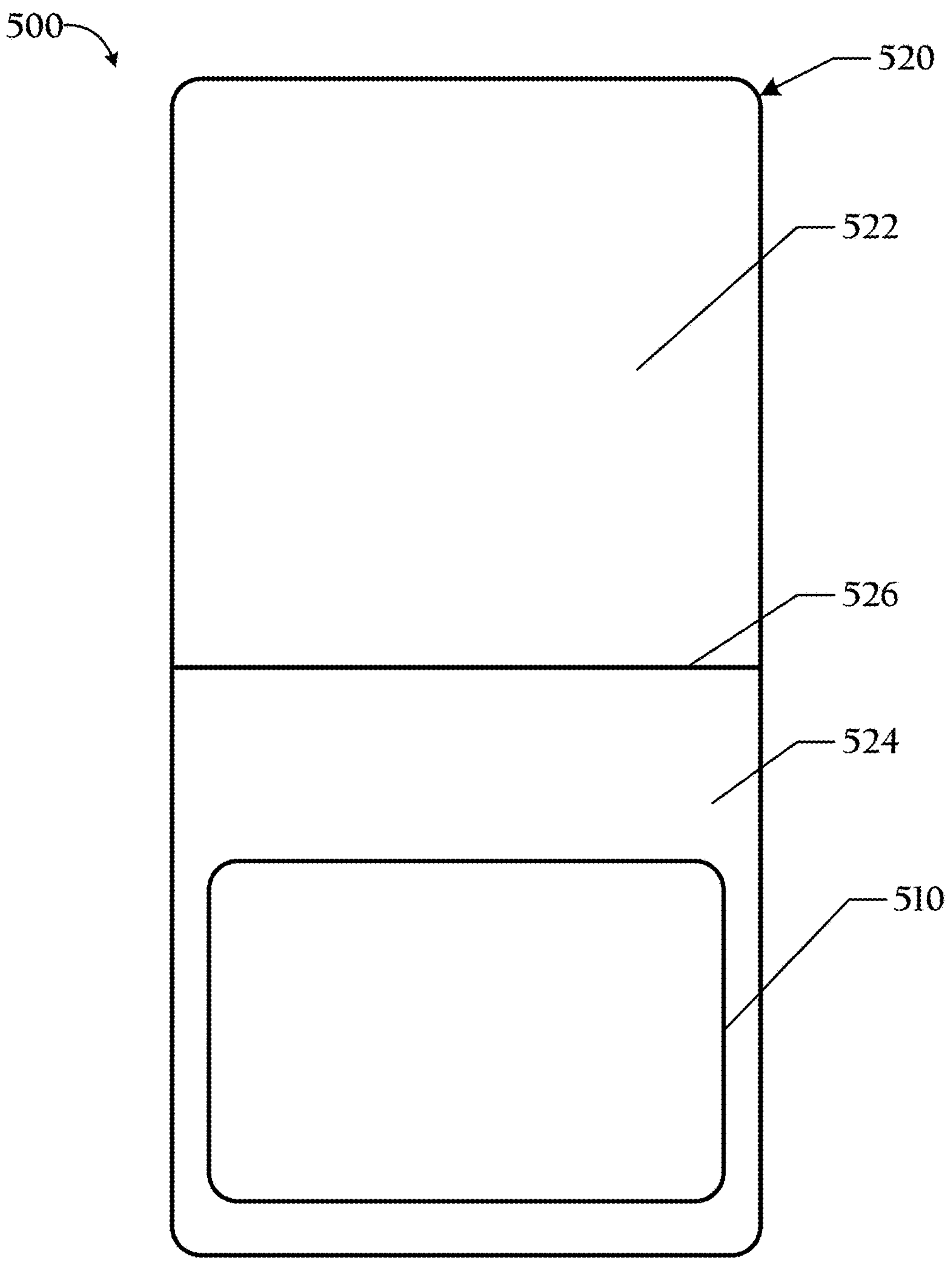
FIG. 5 is a top plan view of another exemplary card and carrier system in an open position in accordance with an embodiment.
Figure 6:
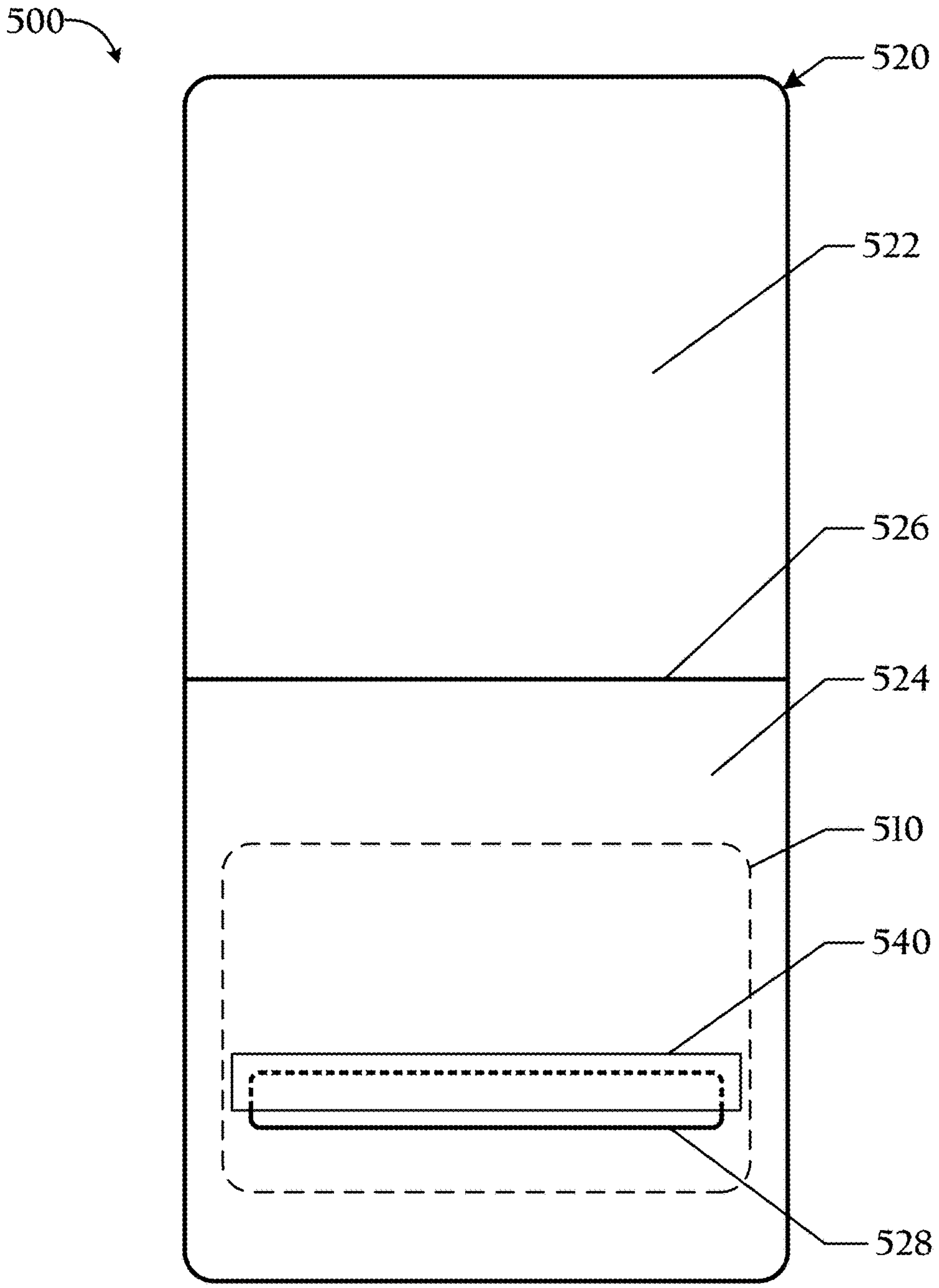
FIG. 6 is a bottom plan view of the embodiment of FIG. 5.

FIGS. 5 and 6 show top and bottom plan views, respectively, of another exemplary embodiment. A system 500 includes a carrier 520 with a two-panel design, similar to that in FIG. 2, that sandwiches a stored value card 510 between two panels 522, 524 by folding the two panels 522, 524 at fold line 526 and adhering the two panels 522, 524 together. The purpose of sandwiching the card 510 is to cover any account identifying elements on the card 510 from view and to cover any embossed account identifying elements with at least one panel of carrier material, thereby preventing fraud. Adhesive is used to hold the panels 522, 524 together. Alternatively, the panels 522, 524 can be sealed together by heat sealing, ultrasonic welding, corresponding physical protrusions (with or without adhesive), any of a variety of sealing means, or combinations thereof.

The card 510 is attached to the carrier 520 by any suitable means. The carrier 520 includes an opening or aperture 528 through which a portion of the card 510 shows through. A tamper evident label 540 is adhered to the carrier 520 and card 510 (seen in FIG. 6) over at least a portion of the opening 528, which is for the purpose of covering certain account identifying information on the card 510. The label 540 would be removed sufficiently (if not entirely) to activate the card 510. The label 540 adds further protection to the card 510 from fraud, while allowing access to the card 510.

Figure 15:
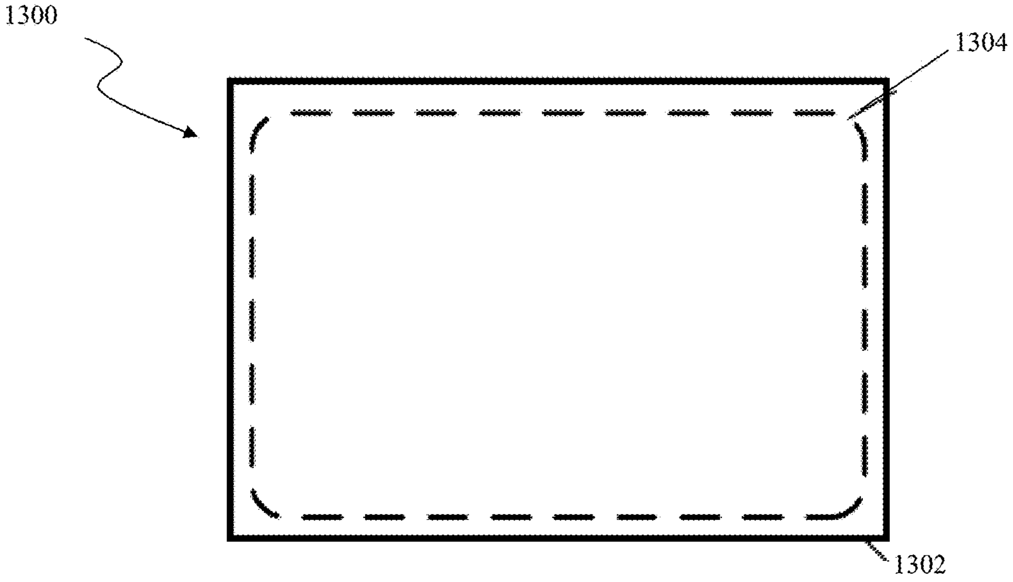
FIG. 15 is a top view of a card and label system according to an embodiment.

In another embodiment, and referring to FIG. 15, the assembly does not include a carrier or optionally includes a carrier, and instead is made up of a stored value card 1304, and a tamper evident label 1302 covering at least a portion of front and/or back of card 1304, and preferably substantially an entire surface (or more) of card 1304, to obscure and protect sensitive account information, such as, for example, account activation indicia (not shown), PIN (not shown), PAN, account identification indicia (e.g. barcode or magnetic stripe), or combinations thereof. Optionally, a serial number is visible for identifying the card type. In the event, the label has been tampered with or removed completely, the cashier does not activate the card (for inactive cards) or removes the cards from display (for inactive or active cards).

In yet another embodiment (not shown), the card and/or label is coupled to an insert or separate panel that is inserted between the panels of the carrier. In this embodiment, the label is viewable from an exterior of the carrier via a window formed in the carrier, such as an aperture with or without a transparent material formed over the aperture. In this embodiment, tampering is evident via distortion or destruction of the label viewable through the opening.

FIGS. 1-6 and 15 depict exemplary embodiments of the stored value card system. The components shown and provided above are illustrative and alternative and/or additional components are also contemplated. Some of the main components shown will, however, be described in more detail below.

In general, stored value cards are forms of transaction instruments associated with transaction accounts, in which the stored value cards provide cash equivalent value that may be used within an existing payment/transaction infrastructure. Stored value cards are frequently referred to as gift, pre-paid or cash cards, in that money is deposited in an account associated with the card before use of the cards is allowed. In general, such an account may be used for transactions between a user and a merchant through any suitable communication means, such as, for example, a telephone network, intranet, the global, public Internet, a point of interaction device, online communications, off-line communications, wireless communications, and the like. They may also be used in person at any point of sale (automated or not) that accepts them. The type of stored value card may be a gift card, loyalty card, credit or debit card, health or insurance card, phone card, pre-paid phone card, membership card, identification card, ring tone card, or any other type of card. The stored value card may be any such transaction instrument associated with any such transaction account.

The stored value card is typically the size and shape of a conventional credit card (i.e., CR80), although other sizes and shapes are possible, such as, for example, embodiments depicted and described in U.S. Patent Application Publication No. 2016/0031624, entitled "Tamper Evident Secure Pack with Anchored Card Carrier" and incorporated herein by reference in its entirety. The stored value card is commonly made of plastic, wood, bamboo, or paper, however other materials, such as other synthetic or natural materials are also contemplated.

The stored value card includes an account identifying element, such as a magnetic stripe, radiofrequency identification (RFID), bar code, QR code, text (recognized by Optical Character Recognition (OCR)), smart chip, for example. The account identifying element is encoded with data, which includes a unique account number. If the stored value card includes a magnetic stripe, that magnetic stripe may comprise a plastic film including tiny magnetic particles that can be magnetized in certain directions to record data on the card, which may be read by a card reader. If the stored value card includes a bar code or QR code, the bar code may comprise machine-readable data, which may be alpha-numeric. Bar code data includes black and white lines arranged to represent a series of numbers (e.g., a bar code comprising a Universal Product Code (UPC) has twelve digits) to a bar code scanner (printed account identifying elements). Other current or future developed account identifying elements are also possible. Also, more than one account identifying element may be included on the stored value card, and in any location.

The stored value card may include embossed or non-embossed features. An account identifying element(s) on the stored value card may be embossed (including at least one raised portion (e.g., letters, designs), or protuberance, etc.), or non-embossed.

The stored value card is generally secured to the carrier such that account identifying elements or information (e.g. card or account identification number, PIN, etc.) is adjacent to the carrier, such that the account identifying elements or information are/is not able to be viewed, and only the activation data that is associated with the card or correlated to the account identifying elements is accessible, while the card is attached to the carrier. The stored value card has two sides and is preferably attached to the carrier such that the side including the account identifying element is facing the carrier. The card is securely attached by a suitable adhesive or attachment means (not shown). The activation indicia, such as a barcode or magnetic strip, can be on the carrier, the card, an optional insert, the label, or any combination thereof.

In an alternative embodiment of the invention, the assembly does not include a stored value card. Rather, sensitive information regarding a stored value or transaction account is secured within a tamper evident carrier with label as described above. Sensitive information related to the account can include, but is not limited to, account identifying elements, activation indicia, PIN, account number, and/or an account user's information. One or more labels, as described herein, are coupled to the carrier to obscure the sensitive information, or at least a portion thereof. Upon purchase of the carrier, the one or more labels can be removed without destroying the readability (human or machine) of the sensitive information.

The carrier includes one or more panels, as shown in FIGS. 1-6. Other constructions are also possible, however, that may include more panels or may be made of more than one piece of material. Preferably, the carrier is made of lightweight cardboard or paper, however other materials, such as plastic or synthetic paper, are also contemplated. The material may optionally be laminated on one or more sides thereof with a transparent material capable of receiving printed material. The laminating material may be a plastic material such as polyvinyl chloride (PVC), polyethylene terephthalate (PET), polyethylene terephthalate glycol (PETG), or acrylonitrile butadiene styrene (ABS). The laminating material may be bonded or applied to the sheet of material in a conventional matter as is well known in the art. The purpose of the laminating layer is to provide the carrier with a certain degree of rigidity, which facilitates the handling thereof.

While not shown in FIGS. 1-6 and 13, the front and/or rear of the systems (card and/or carrier) may be printed with information to promote the card when it is displayed at a retail establishment location, such as the name or logo of the retail establishment, a predetermined amount or value of the card, and so forth.

Figure 7:
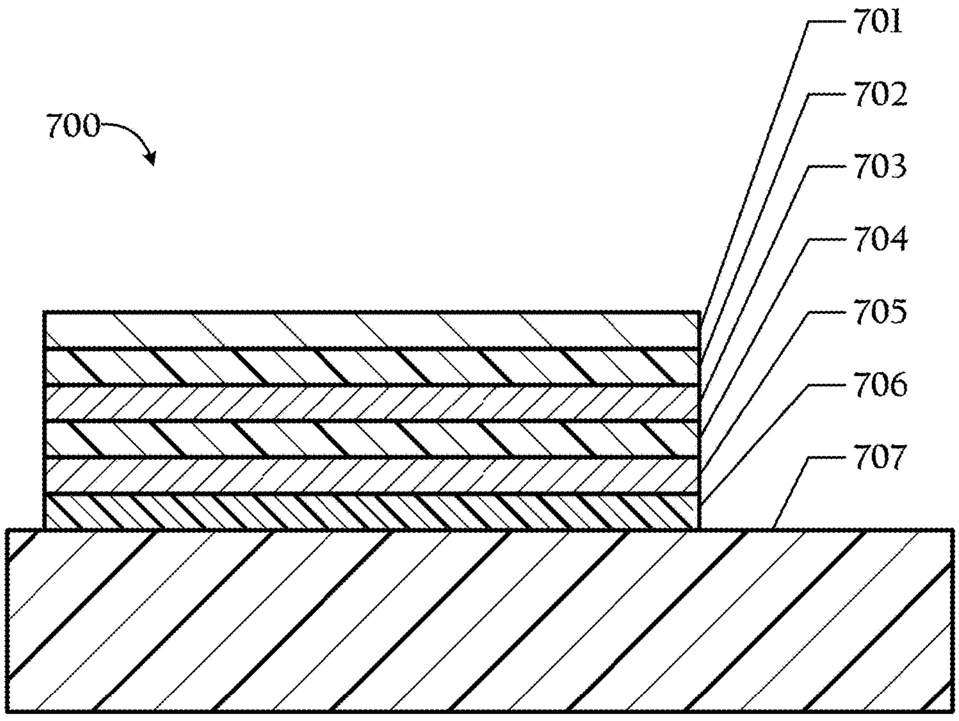
FIG. 7 is a cross-sectional view of an exemplary label.

FIG. 7 shows an exemplary cross-sectional view of a tamper evident label, according to an embodiment. The tamper evident label, with release liner, is depicted as 700. The embodiment of the tamper evident label shown in FIG. 7 comprises a lamination layer 701, a clear (e.g. transparent or translucent) polyester layer 702, a break-away coating layer 703, a holographic engraving layer 704, a holographic metallization layer 705 and a removable adhesive layer 706. The label is shown adhered to a release liner 707. Although the layers 702-705 are presently separately in FIG. 7, these layers do not necessarily need to be separately applied during making of the tamper evident label. In the an embodiment, the three layers 702-705 are part of one composite film or product, such as cold foils available from K Laser Technology (USA) Co., Ltd. in Sarasota, Fla. (formerly AMAGIC Holographics). The use of other cold foils or similar materials is also possible, such as those commercially available (Crown Roll Leaf, for example).

In order to form the tamper evident label and release liner combination 700, first, a suitable foil is provided. Next, a removable adhesive layer 706 is applied to one side of the foil, such as the composite foil of layers 702-705. The removable adhesive layer 706 preferably comprises an ultra removable hot melt pressure sensitive adhesive. Preferably, the removable adhesive is a fugitive (i.e., removable) adhesive manufactured by Northwest Adhesive, Inc. of Vancouver, Wash., U.S.A. Preferably, the removable adhesive layer 706 can be rubbed off or otherwise removed easily after the clear polyester lamination layer and break-away coating layers (701, 702) break away from the cold foil and adhesive of the tamper evident label. Other adhesives are also possible. Preferably the removable adhesive layer 706 has a thickness of in the range of about 0.0003 to about 0.001 in. (0.0254 mm).

The next step is to apply a release liner 707 to the removable adhesive layer 706 opposite the composite foil layer (702-705). A preferred release liner material is 383670 60 gram glassine "easy release" pressure sensitive release liner (available from Wausau Papers in Mosinee, Wis., U.S.A.).

Next, any desired printing or graphics on the construction described above are added to the free side of composite foil layer (702-705).

The next step is to add the lamination layer 701 to the printing or graphics or to the free side of the composite foil layer (702-705), if no printing or graphics are added. The lamination layer 701 is preferably a polypropylene film with pressure sensitive adhesive (self adhesive), but could also be a polystyrene or a polyester, for example. A preferred pressure sensitive polypropylene is manufactured by Sekisui Ta Industries L.L.C. (Garden Grove, Calif., U.S.A.). The lamination layer 701 is provided preferably to give the label some rigidity for desired applications. The preferred rigidity of the lamination layer 701 is higher than the rigidity of the cold foil layer (702-705). Preferably, the lamination layer 701 has a thickness in the range of approximately 48 gauge (approximately 0.0005 inches) to approximately 0.003 inch, most preferably about 0.002 in. (0.0508 mm).

The layers described above are laminated together. The next steps in preparing the label include die-cutting the layered material and removing surrounding waste material.

Figure 8:
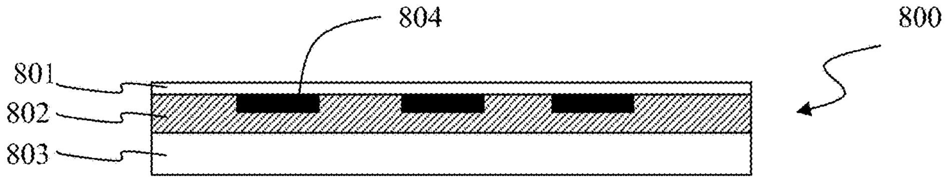
FIG. 8 is a cross-sectional view of another exemplary label.
Figure 9:
FIG. 9 is a top view of the label of FIG. 8.

In another embodiment of the invention, and referring to FIGS. 8 and 9, a tamper evident label 800 includes a top polyester or plastic layer 801, similar to polyester layer 702 described with respect to the embodiment depicted in FIG. 7, a center foil layer 802 of engravable or etchable holographic foil (with or without the breakaway layer described above), and a removable adhesive layer 803. Foil layer 802 includes indicia 804 such as text and/or graphics etched in the foil to enhance security by enhancing destruction or distortion characteristics when removed. In one particular embodiment, a proprietary text and/or graphics are etched into the foil to form a custom print etched foil layer to enhance security. In alternative embodiments, a standard cold foil or metalized film can be printed and/or etched with security features.

Adhesive layer 803 comprises a higher tack adhesive than removable adhesive 706 described above. This allows for a sufficient bond of the label 800 to the card and/or carrier, while leaving virtually no or little residue on the card and/or carrier when the label is removed, or residue that is easily rubbed off. Such adhesive is available, for example, from Henkel Adhesives North America. The combination of the stronger tack adhesive layer 803 and the etched foil layer 802 enhances the security and tamper evident characteristics because after the label 800 is applied, when being removed, the security verbiage and/or graphics printed on or etched into the foil layer 802 will stretch, due to the strong bond to the substrate via layer 803, and may even become unreadable. Even if the label is attempted to be reapplied, evidence of tampering will be clear due to the stretched nature of the label.

One of ordinary skill in the art would also recognize that adhesive layer 803 can be used in replace of removable adhesive 706 of the previous embodiments. In addition, holographic engraving layer 704 and/or a holographic metallization layer 705 can also be etched or printed with custom or security features.

In an alternative embodiment of the invention (not shown), the label includes a portion, such as a partial layer, of permanent adhesive that remains on the card after removal of the label. The permanent adhesive can include indicia, such as proprietary text or graphics, thereon or embedded within (printed film encapsulated within adhesive) to provide enhance security and authentication to the card. The label in this instance is placed on the card in an area where the permanent adhesive does not remain on the activation indicia so that the card can be activated when the label is removed. In other embodiments, the permanent adhesive is sufficiently translucent or transparent such that activation indicia, e.g. barcode, remains readable under the permanent adhesive layer.

Figure 10:
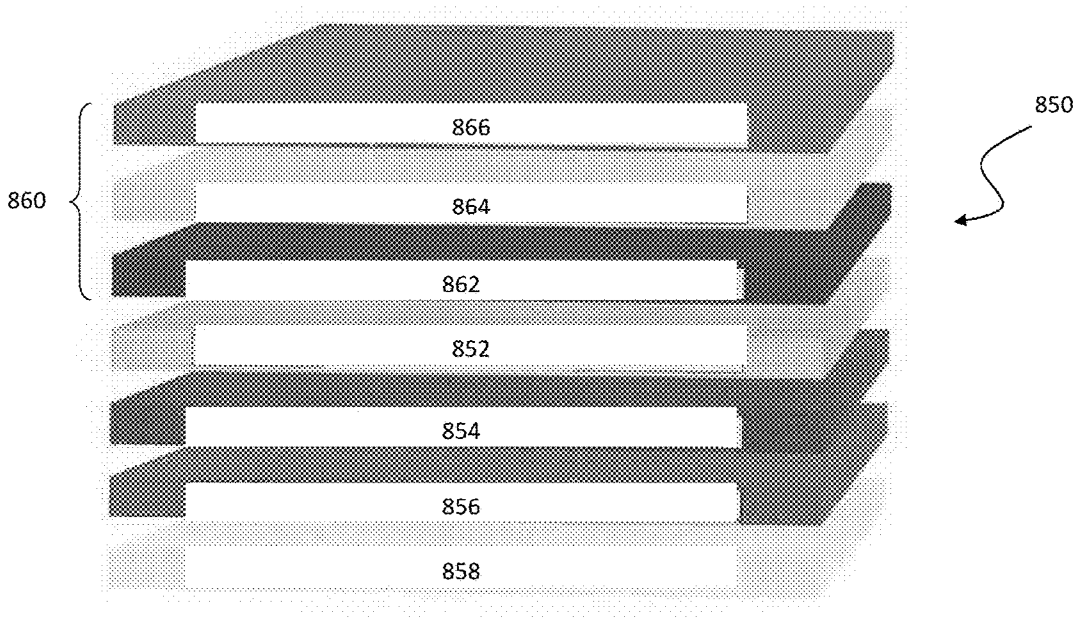
FIG. 10 is an exploded lavational view of another exemplary label.

In another embodiment, and referring to FIG. 10, a tamper evident label 850 comprises, similar to the embodiment of FIG. 7 above, a break-away coating layer 852, an engravable or etchable holographic foil layer 854, and a removable adhesive layer 856, coupled to a removable release liner 858, such as a glassine paper release liner. The foil layer 854 and removable adhesive layer 856 are releasable, via the break-away coating layer 852 (e.g. a clear release layer), from a printable film assembly 860 comprising a polyester or other polymeric film layer 862, such as a clear PET film, coated with an optional white or opaque ink layer 864, and a printable top coat 866. White ink layer 864 can be either flood coated or spot coated on film layer 862, and a printable top coat 866 is applied to the white ink layer 864. This allows printed indicia to be printed on top coat 866. Attempting to remove label 850 from the stored value card and/or carrier causes the printable assembly 860 to break away from the foil layer 854, while removal of the foil layer 854 from the underlying surface causes distortion or destruction of the engraved or etched indicia of foil layer 854.

Figure 11:
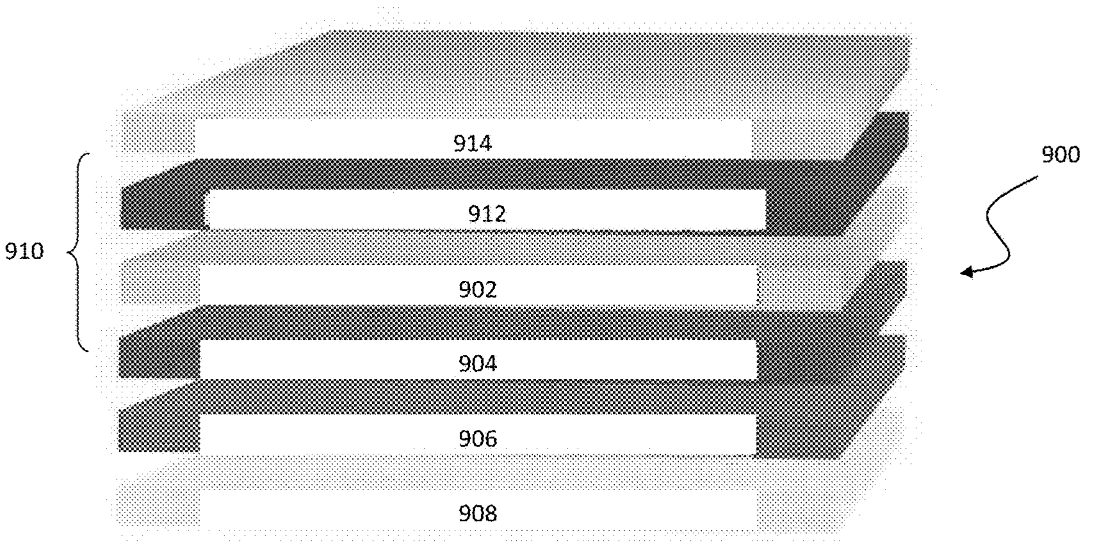
FIG. 11 is an exploded lavational view of yet another exemplary label.

In yet another embodiment, and referring to FIG. 11, a tamper evident label 900 comprises, similar to the embodiment of FIGS. 7 and 8 above, a break-away coating layer 902, an engravable or etchable holographic foil layer 904, and a removable adhesive layer 906, coupled to a removable release liner 908, such as a glassine paper release liner. The foil layer 904 and removable adhesive layer 906 are releasable, via the break-away coating layer 902 (e.g. clear release layer), from a film assembly 910 including a clear printed film 912, such as a PET film having text or indicia printed on a top and/or bottom surface, and a clear laminate layer 914 covering the top surface of the printed film 912. Lamination layer 914 is similar to lamination layer 701 above, and is preferably a polypropylene film (e.g. bi-axially oriented polypropylene (BOPP)) with pressure sensitive adhesive (self adhesive), but could also be a polystyrene or a polyester, for example. Lamination layer 914 adds rigidity to label 900 and provides protection to the underlying printed indicia. Attempting to remove label 900 from the stored value card and/or carrier causes the printed film assembly 910 to break away from the foil layer 904, while removal of the foil layer 904 from the underlying surface causes distortion or destruction of the engraved or etched indicia of foil layer 904.

In embodiments, the overall thickness of the label can range from about 0.5 to 30 mils or more, depending on the application.

In embodiments, the label can include a "dead" or flat portion, with no security features and/or adhesive thereon, that extends from an edge of the label. This portion acts as a pull-tab to facilitate removal of the label when purchased.

While the descriptions above refer to the preferred use of holographic materials, materials which embody alternative optical phenomena (e.g., lenticular, fly's eye, or other lens materials) may be used. Similarly, it is possible for only a portion of the label to be tamper evident material while another portion is deliberately chosen to remain on the card or carrier after removal of the label by way of a permanent adhesive associated with that portion of the label only. For example, a star-shaped permanent portion of the label could be designed to remain on the card, the carrier (or multiple portions could remain on both) to indicate brand identity, or serve as additional verification of authenticity of the card.

Figure 12:
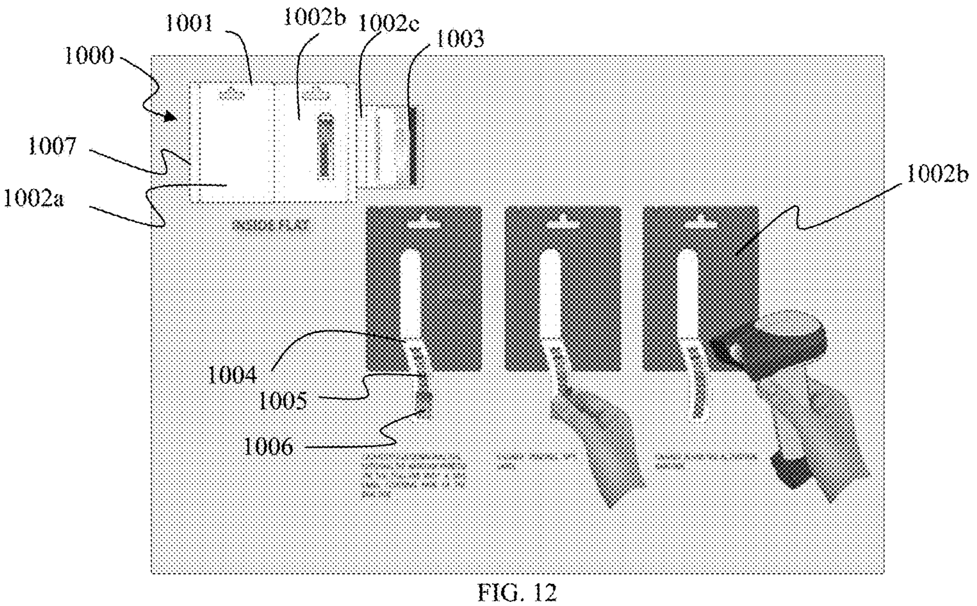
FIG. 12 is an overview of a secure pack assembly with label in use according to an embodiment.
Figure 13:
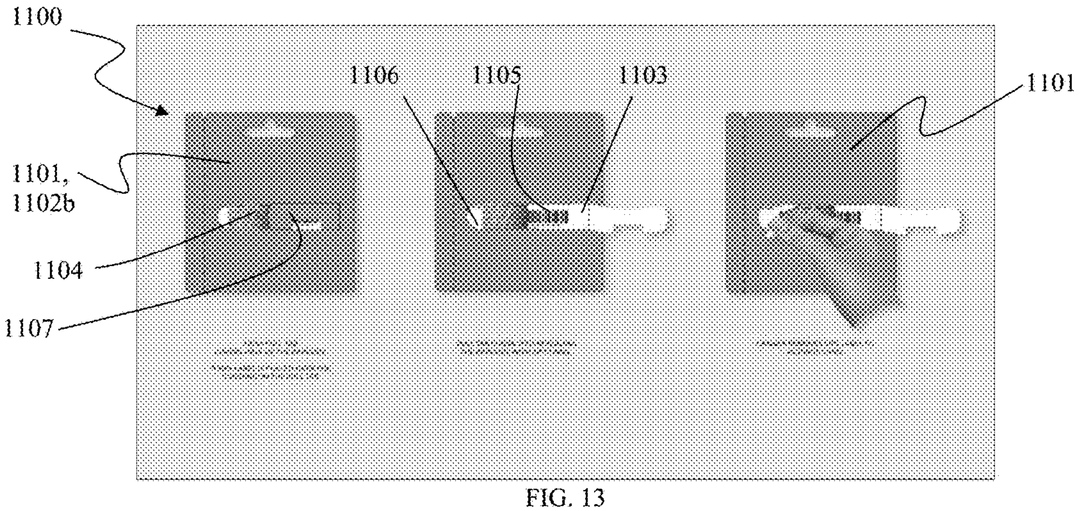
FIG. 13 is an overview of a secure pack assembly with label in use according to another embodiment.
Figure 14:
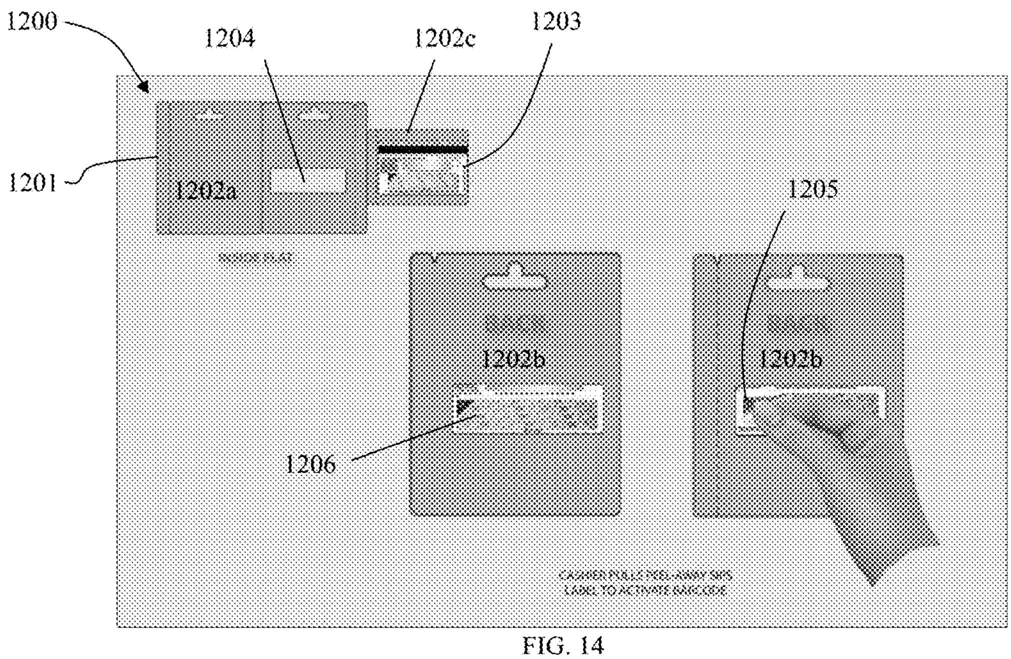
FIG. 14 is an overview of a secure pack assembly with label in use according to yet another embodiment.

Now referring to FIGS. 12-14, in use, labels according to embodiments of the invention can be used in a variety of secure pack configuration assemblies. Referring to FIG. 12, a secure pack assembly 1000 can include a carrier 1001 having at least two panels 1002*a*, 1002*b*, and in this particular embodiment, a third panel 1002*c*, to which card 1003 is mounted on. Panel 1002*c* is folded into and sandwiched between panels 1002*a* and 1002*b*. Back panel 1002*b* includes structure defining a pull-tab 1004, having activation indicia 1005, such as a bar-code, printed on an inner surface of pull-tab 1004, such that it is secured within assembly 1000 when assembled. At least a portion of activation indicia 1005 is obscured by a tamper evident label 1006, according to embodiments described herein.

Upon purchase, a cashier opens pull-tab 1004 to expose label 1006 and activation indicia 1005. In the event label 1006 indicates evidence of tampering (e.g. stretched or distorted label, or removed altogether), the cashier does not activate the card. If there is no evidence of tampering, the cashier removes label 1006, such as by peeling and then rubbing, to expose the entirety of activation indicia 1005, and scans or otherwise reads activation indicia 1005 to activate card 1003 within. Preferably label 1006 comes completely off so as not to affect the readability of indicia 1005. The assembly 1000 can then be opened, such as by tab 1007, after purchase to access card 1003.

Referring to FIG. 13, in an alternative embodiment, a secure pack assembly 1100 includes at least a front panel (not shown) and a rear panel 1102*b* of carrier 1101 secured together to sandwich a card 1103 within. A tamper evident label 1104, according to embodiments of the invention, is placed over at least a portion of activation indicia 1105 (such as a barcode), that is viewable through an aperture 1106 formed in rear panel 1102*b*. A pull-tab 1107 formed in rear panel 1102*b* obscures the remaining portion of activation indicia 1105. The edges of label 1104 are not accessible without showing signs of tampering (e.g. bursting the pull-tab).

Upon purchase, a cashier opens pull-tab 1107 to reveal label 1104 and activation indicia 1105. In the event pull-tab 1107 and/or label 1104 indicates evidence of tampering (e.g. stretched or distorted label, or removed altogether), the cashier does not activate card 1103. If there is no evidence of tampering, the cashier removes label 1104, such as by peeling and then rubbing, to expose the entire of activation indicia 1105, and scans or reads activation indicia 1105 to activate card 1103 within. Preferably label 1104 comes completely off so as not to affect the readability of indicia 1105. The assembly 1100 can then be opened after purchase to access card 1103.

Referring to FIG. 14, a secure pack assembly 1200 can include a carrier 1201 having at least two panels 1202*a*, 1202*b*, and in this particular embodiment, a third panel 1202*c*, to which card 1203 is mounted on. Panel 1202*c* is folded into and sandwiched between panels 1202*a* and 1202*b*. Back panel 1202*b* includes structure defining an aperture 1204. Activation indicia 1205 of card 1203 is aligned with aperture 1204 when assembly 1200 is assembled. A tamper evident label 1206 is positioned on card 1203 at least partially and preferably completely over activation indicia 1205 to obscure the same.

Upon purchase, if label 1206 indicates evidence of tampering (e.g. stretched or distorted label, or removed altogether), the cashier does not activate card 1203. If there is no evidence of tampering, the cashier removes label 1206, such as by peeling and then rubbing, to expose the entirety of activation indicia 1205, and scans or reads activation indicia 1205 to activate card 1203 within. Preferably label 1206 comes completely off so as not to affect the readability of indicia 1205. The assembly 1200 can then be opened after purchase to access card 1203.

While the descriptions above specifically illustrate tamper evident labels used to attach the card to the carrier, such labels could also be used to indicate tampering of the carrier itself, particularly in embodiments of the carrier that are folded or otherwise joined together such that it is desirable to indicate whether the carrier package has been the subject of attempts to open or otherwise tamper with it. Thus, the tamper evident label material could be used to adhere panels together. Yet another option is to use both a conventional adhesive and the tamper proof label to join the panels together, the latter for additional security.

In a similar manner, it should be understood that the tamper evident label serves not only to indicate attempted tampering in embodiments in which a card is attached to a carrier by separate adhesive, but also to affix or otherwise attach the card to the carrier itself without the use of a separate adhesive. In particular, the card could be is attached to the carrier within the folded-up package, although this might prevent someone from seeing the label prior to opening the package and thus minimize the value of a tamper evident label.

In the context of the embodiments described above, tampering may be detected by one or more of stretching or other physical distortion of the label; or by changes in the appearance of the optical pattern incorporated into the label; or both, as the case may be. In this regard, tampering may be detected by visually comparing a known sample of unaltered label material with a sample suspected of tampering, and noting the nature and degree of differences in accordance with the understanding of one skilled in the art. For example, in the case of holograms, it is common in the art to use relatively small, finely detailed and highly repetitive patterns or security-related messages (e.g., "Genuine" or "Original"), or can include indicia such as graphics, logos, and/or text identifying the issuer of the card or servicers of the account. Distortion to such patterns and messages are quickly identifiable as evidence of tampering. In addition, optical phenomena such as lenticularity and holography are carefully designed to exhibit distinctive optical effects such as changing images or iridescence (change in observed hue with change in viewing angle). Such effects are substantially altered, if not destroyed, when the tamper evident label is even slightly stretched, wrinkled, or otherwise distorted.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

We claim:

1. A stored value card and carrier system, the system comprising:
- a carrier;
- a stored value card attached to the carrier; and
- a label adhered to at least one of a portion of the stored value card, a portion of the carrier, or an insert contained within the carrier, wherein the label includes a foil layer with etched text or graphics formed thereon, and an adhesive layer,
- wherein at least partial removal of the label at least partially distorts the etched text and or graphics to optically indicate tampering with the system,
- wherein the carrier includes structure defining an aperture over which the card is placed such that information on the card is proximate the aperture, and wherein the label at least partially obscures the information on the card such that the information is unusable or unreadable until at least a portion of the label is removed to expose the information through the aperture.

2. The stored value card and carrier system of claim 1, wherein the label is adhered only to the carrier to indicate tampering with the carrier itself.

3. The stored value card and carrier system of claim 1, wherein the label at least partially secures the card to the carrier or insert contained within the carrier.

4. The stored value card and carrier system of claim 1, wherein the label partially or completely obscures activation indicia on the card, the carrier, or both.

5. The stored value card and carrier system of claim 1, wherein the label completely covers the card to sandwich the card between the label and the carrier.

6. The stored value card and carrier system of claim 1, wherein the carrier comprises a front panel coupled to a back panel, and a third panel hingedly coupled to the back panel, wherein the stored value card is secured to the third panel, and wherein the third panel is folded towards the back panel to sandwich the third panel with the stored value card thereon and the information on the card is positioned proximate the aperture.

7. A stored value card and carrier system, the system comprising:
- a carrier including structure defining a pull tab, the pull tab being irreversibly shiftable between a closed position and an opened position;
- a stored value card coupled to the carrier;
- activation indicia applied to at least one of the stored value card and an interior surface of the carrier such that at least a portion of the activation indicia is obscured when by the carrier when the pull tab is in the closed position; and
- a tamper evident label covering and obscuring at least a portion of the activation indicia such that the information is unusable or unreadable until the pull tab is in the opened position and at least a portion of the label is removed,
- wherein at least partial removal of the label at least partially distorts the tamper evident label to optically indicate tampering with the system.

8. The system of claim 7, wherein the activation indicia is applied to an interior surface of the pull tab, and wherein the tamper evident label is adhered to the internal surface to obscure at least a portion of the activation indicia.

9. The system of claim 7, wherein the activation indicia is applied to the stored value card, and the stored value card is positioned within the carrier such that at least a portion of the activation indicia is obscured by the pull tab when in the closed position, and viewable therethrough when the pull tab is in the opened position.

10. The system of claim 9, wherein the tamper evident label is applied to the stored value card to at least partially obscure the activation indicia.

11. The system of claim 9, wherein the carrier includes structure comprising an aperture adjacent the pull tab, such that a first portion is obscured by the pull tab when in the closed position, and wherein the tamper evident is applied to the system to cover a second portion of the activation indicia that is not obscured by the pull tab when in the closed position, and wherein an entirety of the activation indicia is readable when both the pull tab is in the opened position and the tamper evident label is removed.

12. The system of claim 11, wherein the tamper evident label is applied to the stored value card directly to obscure the second portion of the activation indicia.

13. The system of claim 11, wherein the tamper evident label is applied over the aperture formed in the carrier to obscure the second portion of the activation indicia.

14. The system of claim 7, wherein the activation indicia comprises a barcode.

15. The system of claim 7, wherein the tamper evident label includes a foil layer with etched text, graphics, or both formed thereon, and an adhesive layer for coupling the tamper evident label to one of the stored value card and the carrier.

16. The system of claim 7, wherein the carrier comprises a front panel coupled to a back panel, and a third panel hingedly coupled to the back panel, wherein the stored value card is secured to the third panel, and wherein the third panel is folded towards the back panel to sandwich the third panel with the stored value card thereon.

17. The system of claim 16, wherein the activation indicia is applied to the stored value card and the tamper evident label is applied directly to the stored value card over at least a portion of the activation indicia.

18. The system of claim 16, wherein the activation indicia is applied to an interior surface of the pull tab, and wherein the tamper evident label is adhered to the internal surface to obscure at least a portion of the activation indicia.

* * * * *